MINIATURE AUTOMOBILE RACING GAME UTILIZING ADHESIVE CONNECTION

Original Filed March 30, 1965

INVENTOR
EDWARD H. YEAGER
BY Freeman & Sayler
ATTORNEYS

United States Patent Office

Re. 27,164
Reissued Aug. 10, 1971

27,164
MINIATURE AUTOMOBILE RACING GAME UTILIZING ADHESIVE CONNECTION

Edward H. Yeager, Akron, Ohio, assignor to Mattel, Inc., Hawthorne, Calif.

Original No. 3,335,520, dated Aug. 15, 1967, Ser. No. 443,891, Mar. 30, 1965. Application for reissue Aug. 12, 1969, Ser. No. 860,446
Int. Cl. A63h *33/26*
U.S. Cl. 46—243M 5 Claims

Matter enclosed in heavy brackets [ ] appears in the original patent but forms no part of this reissue specification; matter printed in italics indicates the additions made by reissue.

*ABSTRACT OF THE DISCLOSURE*

*A toy auto track having a surface with series of motor driven belts arranged thereover in a closed path and toy autos for movement over said path. Adhesive means, such as tape, with a downwardly directed exposed adhesive surface is affixed to the underside of each auto in position to contact and adhere to the moving belt. Rails and/or pivoted members along the path guide the autos directionally.*

This invention relates to the art of action toys and in particular relates to a miniaturized automobile racing game having improved means for propelling the automobiles around varying circuits of a racing track.

Miniature racing games of this type have long been known in the prior art and have envisioned many types of operations designed for the purpose of propelling miniature automobiles over a given course in simulation of racing conditions.

While toys of this general category have achieved a considerable measure of commercial success, difficulties have always been encountered with respect to the provision of means for propelling the cars. In the earliest concept of this art, the cars of this type were generally self-propelled so as to move around the track and expend their stored energy that was created by winding, for example.

More recent refinements of this art have included electrification of the track per se, with such electrified track serving to actuate a motor mechanism on the car and thus propel the same through the course of the track.

From a practical standpoint, each of the above two approaches has required the use of expensive specially built miniature cars and/or tracks, as the case may be. Further and by way of limitation of the present known games of this type, the same normally have a repetitive track pattern that precludes the running of different courses without the use of elaborate switching equipment.

It has been found that the above mentioned disadvantages can be obviated by utilizing a simplified type of game board wherein the track carries an endless belt member, such as string or cord, that is exposed about the track surface for engagement with a readily attachable substance, such as adhesive material that is adhered to the underside of any conventional miniature automobile. In this fashion, any standard miniaturized car can be converted with a minimum of effort to become a racing car adapted for use on the game board in question.

It has further been found that an almost endless variety and number of tracks can be provided and yet operated by the operator with the utmost simplicity so as to permit the establishment of various "courses" upon which different races can be run.

Production of an improved racing game having the above described advantages accordingly becomes the principal object of this invention, with other objects of the invention becoming more apparent upon a reading of the following brief specification, considered and interpreted in the light of the accompanying drawings.

Figure 1:
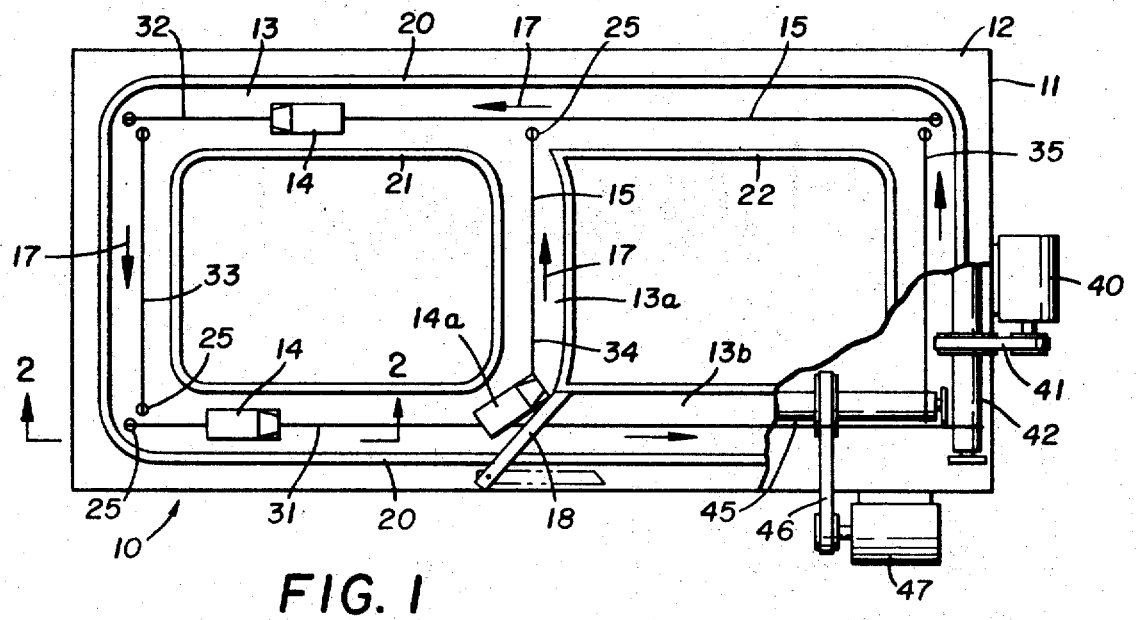
FIGURE 1 is a plan view of the improved game board, partly broken away in the top surface thereof to show the driving mechanism employed.

Referring now to the drawings, and in particular to FIGURE 1, thereof, the improved racing game, generally indicated by the numeral 10, is shown including a base frame 11 having a top surface 12 within which an endless track 13 is provided, with cars 14, 14 being motivated by string drives 15, 15 in the direction of the arrows 17, 17, with the course of the race being determined by actuation of switching element 18, as will be described in greater detail.

Considering first then the detailed structure of the track 13 and referring to FIGURE 1, it will be noted that the same is defined by an outer perimeter rail 20, as well as two inner perimeter rails 21 and 22 that define an endless track of generally "figure 8" configuration in plan.

For the purpose of effectuating switching there is provided a switching arm 18 pivoted to top surface 12 of frame 11, shown movable between the full and chain-dotted line positions of FIGURE 1 for the purpose of directing the autos 14, 14 into either track segment 13a (when in full lines) or track segment 13b (when in dotted lines). Pivoting of this arm may be either manually, or by electric impulse means, if desired.

For the purpose of providing driving impetus to drive the cars 14, 14 through the course of the track 13, it will be noted that the top surface 12 thereof is provided with a series of apertures 25, 25 through which endless cords may be played, as will now be described.

Figure 2:
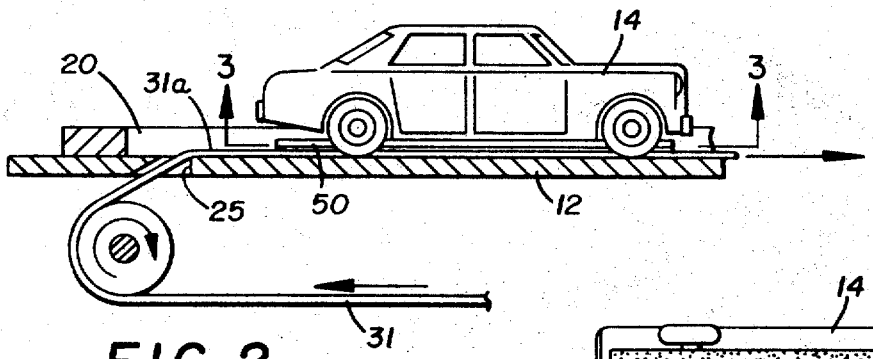
FIGURE 2 is a sectional view taken on the lines 2—2 of FIGURE 1.
Figure 5:
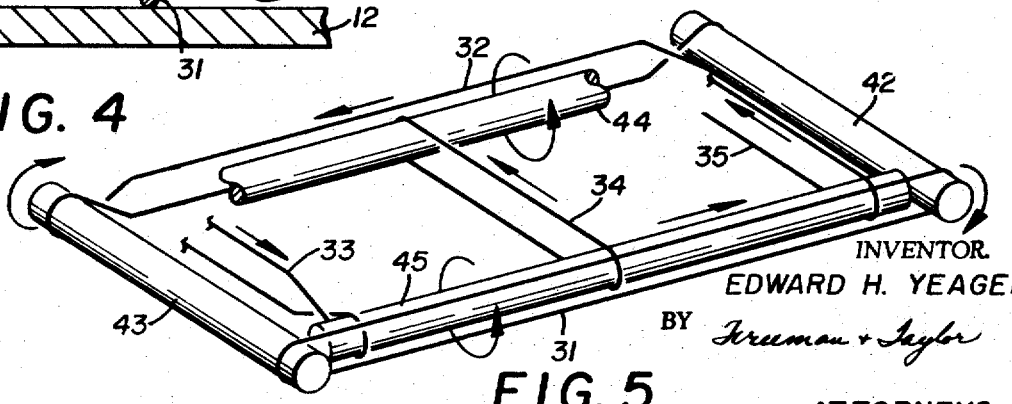
FIGURE 5 is a schematic view of the driving mechanism employed for propelling the cars across the racing course.

Accordingly, and with reference to FIGURE 5 wherein the driving mechanism is illustrated schematically, it will be basically noted that five cords 31, 32, 33, 34 and 35 are mounted on a series of rollers 42, 43, 44, and 45, with it being understood that a portion of each cord will pass through apertures 25, 25 and be exposed above the board surface 12, as clearly shown in FIGURE 2, where the cord 31 has an exposed segment 31a thereof clearly positioned above the top surface 12 for frictional engagement with a car.

Relating FIGURE 5 to FIGURE 1, the cords 31 and 32 are respectively provided in the long lower and upper portions of the track 13 while endless cords 33, 34 and 35 are disposed transversely of the track from left to right as viewed in FIGURE 1.

Reference is next made to FIGURES 1 and 5 for a detailed consideration of the manner in which the driving force is supplied to the just described cords 31 through 35. As will be noted in FIGURE 1, a motor 40 drives a belt 41 that, in turn, imparts a clockwise rotation to the roll 42. A similar roller 43 is disposed at the opposed end for connection with endless strings 31 and 32, as shown in FIGURE 5. By reversal of the string 32, as shown in FIGURE 5, the cords 31 and 32 will move in opposite directions, as clearly shown by the arrows 17 in FIGURE 1.

With reference to the cords 33 through 35, there are mounted above the appropriate portions of opposed ollers 44 and 45, with roller 45 being driven by belt 46 hat is, in turn, driven by motor 47 so as to impart a ounterclockwise rotation to rollers 44 and 45. The movenent of cord 33 in the opposed direction to that of cord 5 is achieved by looping or reversing the same, as clearly hown in FIGURE 5.

Figure 3:
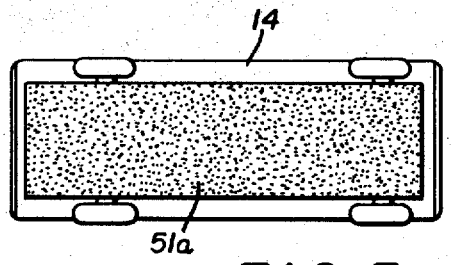
FIGURE 3 is a sectional view taken on the lines 3—3 of FIGURE 2.
Figure 4:
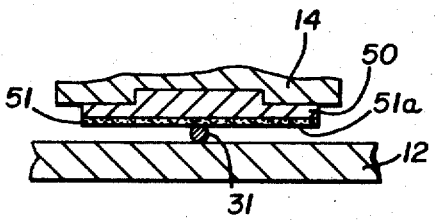
FIGURE 4 is an enlarged sectional view showing the manner of attachment between adhesive pad and car in the preferred form of the invention.

Turning next to a consideration of the connecting means arried by each auto 14, reference is made first to FIGURES 2 through 4 wherein a pad 50 is shown secured to he underside of the car frame, with clearance being rovided between the underside of pad 50 and the track urface, as defined by the top surface 12. Such construcion permits normal usage of the toys away from the race rack due to the road clearance that is provided.

While various types of connection means can be emloyed, FIGURE 4 shows the use of connector pads 50, 50 that may have one side spot glued or otherwise ecured to an appropriate portion of the undercarriage. A tape 51 having an adhesive surface 51a is provided on he other side of pad 50, with the arrangement being uch that this adhesive tape will frictionally engage the ords and thus movement of the cords about their rollers will impart movement to the cars through the course of he track 13.

In this regard, it should be noted that the broad adhesive surface provided, as shown in FIGURE 3, preludes disengagement when the car 14 is switching from engagement with one string belt to another and, in this egard, and considering the car indicated by the numeral 14a in FIGURE 1, it will be noted that the adhesive pad emains in contact with the original belt until full contact with the succeeding belt is achieved.

In use or operation of the improved game, it will first e assumed that the game board and cars have been ssembled to the condition indicated in the drawings, and t this time it is merely necessary that a car be placed on he track and both of the motors 40 and 47 energized o initiate rotation of the string members 31 through 35 n the directions shown by the arrows. The frictional ontact between the string and tape 51 will then propel he car along the track 13 on a selected course, which may be varied by use of the switching member 18.

Thus when switching member 18 is moved to the full line position of FIGURE 1, a car 14a will be diverted onto track 13a. Similarly, when the car contacts rail 20 adjacent the corners of track 13 the car will be diverted from contact with cord 32 to contact with cord 33 for example. In this fashion, variety of courses can be run such as two full laps, followed by one short lap and three long laps, as desired, to thus provide an infinite variety in the number of course conditions that can be established.

When the car is removed from the track, it is operable in normal fashion because of the clearance provided between pad 50 and the floor. It will be further noted that the adhesive contact pad is susceptible to attachment to any existing car without modifying the same. Further, in the event that the tape becomes worn or otherwise unsatisfactory, it is a simple matter to replace the same.

While a full and complete description of the invention has been set forth in accordance with the dictates of the patent statutes, it is to be understood that the invention is not intended to be limited to the specific embodiments herein shown.

Thus, and while a simple figure 8 pattern has been shown with one switch, it is obvious that other patterns employing a plurality of tracks and a plurality of switches could be provided to make a larger number of racing variations possible. Also, the principles can be achieved to propel a car up an incline so that the balance of the race may be run in a freed condition similar to that of a roller coaster. Further, the invention additionally contemplates the elimination of the guard rails shown, together with the utilization of a rheostate type control to vary the speed of the motor and, accordingly, the linear speed of the belts. In such situations, centrifugal force would dislodge the car from the belt in the event of excess speed to provide an added increment of thrill to the improved racing game.

These and other modifications of the invention may, accordingly, be resorted to without departing from the spirit hereof or the scope of the appended claims.

What is claimed is:

1. A game board having a racing track provided thereon and adapted to guide a movable wheeled vehicle along a predetermined path, comprising;

(A) at least one endless [cord] *belt* member having an exposed segment thereof disposed above the surface of said track;

(B) means for driving said [cord] *belt* member relatively of said track; and (C) adhesive means (1) carried by said vehicle on the undersurface thereof and (2) having a minimal clearance with respect to said track surface (3) with said adhesive means frictionally engaging said exposed segment of said [cord] *belt* member while said wheels engage said racing track (a) whereby said vehicle may be moved along said racing track upon actuation of said means for driving said [cord] *belt* member.

2. A game board having a racing track provided thereon and adapted to guide a movable wheeled vehicle along a predetermined path, comprising;

(A) a plurality of endless [cord] *belt* members (1) each having an exposed segment thereof disposed above the surface of said track, (2) with said [cord] *belt* members being disposed with regard to said game board so as to form an endless track;

(B) means for driving said [cord] *belt* members relatively of said track;

(C) adhesive means (1) carried by said vehicle on the undersurface thereof and (2) having a minimal clearance with respect to said track surface (3) said adhesive means frictionally engaging at least one exposed segment of said [cord] *belt* members (a) whereby said vehicle is attached to said [cord] one *belt* member for movement of said vehicle relatively of said track upon actuation of said means for driving said [cord] *belt members*; and (D) means for diverting said vehicle from contact with said one [cord] *belt* member into contact with an adjacent [cord] *belt* member (1) whereby the direction of movement of said vehicle may be altered.

3. The device of claim 2 further characterized by the fact that said drive means include;

(A) motor means (B) a series of rollers arranged in parallel pairs driven by said motor means;

(C) said endless [cord] *belt* members being carried by said rollers (1) whereby actuation of said motor means causes said endless [cord] *belt* members to be driven about said rollers.

4. A game board having a racing track provided thereon and adapted to guide a movable wheeled vehicle along a predetermined path, comprising;

(A) a plurality of endless [cord] *belt* members (1) each having an exposed segment thereof disposed above the surface of said track and including (a) a first pair of [cord] *belt* members disposed in substantially parallel relationship to each other, and (b) a second pair of [cord] *belt* members disposed in substantially parallel relationship to each other and at right angles to said first pair of [cord] *belt* members;

(B) means for driving said [cord] *belt* members relatively of said track;

(C) adhesive means (1) carried by said vehicle on the undersurface thereof, and (2) having a minimal clearance with respect to said track surface (3) said adhesive means frictionally engaging at least one exposed segment of said [cord] *belt* members (a) whereby said vehicle is attached to said [cord] one *belt* member for movement of said vehicle relatively of said track upon actuation of said means for driving said [cord] one *belt member*; and (D) means for diverting said vehicle from contact with said [cord] one *belt* member into contact with an adjacent one of said [cord] *belt* members (1) whereby the direction of movement of said vehicle may be altered.

5. The device of claim 4 further characterized by the presence of (A) a third [cord] *belt* member disposed in parallel relationship to one of said pairs of [cord] *belt* members; and (B) switching means (1) carried by said board and (2) adapted to divert said vehicle from one of said pair of [cord] *belt* members onto a [cord] *belt* member disposed at right angles thereto.

References Cited

The following references, cited by the Examiner, are of record in the patented file of this patent or the original patent.

UNITED STATES PATENTS

| | | | |
|---|---|---|---|
| 311,219 | 1/1885 | Anderson | 46—122 |
| 2,254,967 | 9/1941 | Larkins | 46—122X |
| 3,218,757 | 11/1965 | Benkoe | 46—244UX |
| 3,263,444 | 8/1966 | Di Croce | 63—15.7 |

FOREIGN PATENTS

| | | | |
|---|---|---|---|
| 1,184,262 | 12/1964 | Germany | 46—202 |

E. BARRY SHAY, Primary Examiner

U.S. Cl. X.R.

46—206; 273—86